US007738641B1

(12) United States Patent  (10) Patent No.: US 7,738,641 B1
Croak et al.                (45) Date of Patent:     Jun. 15, 2010

(54) METHOD AND APPARATUS FOR UTILIZING A TIERED FLAT RATE PRICING STRUCTURE IN A PACKET NETWORK

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1262 days.

(21) Appl. No.: 11/240,028

(22) Filed: Sep. 30, 2005

(51) Int. Cl.
    *H04M 15/00*  (2006.01)
(52) U.S. Cl. .................. 379/114.06; 379/115.01; 379/120; 370/352; 370/356; 370/357
(58) Field of Classification Search ............... 379/111, 379/114.01, 114.03, 114.06, 114.09, 114.12, 379/114.17, 115.03, 121.01, 121.02, 127.04, 379/120, 115.01; 370/352, 356–362
    See application file for complete search history.

(56) References Cited

U.S. PATENT DOCUMENTS

| | | | |
|---|---|---|---|
| 2002/0076018 A1* | 6/2002 | Banks et al. | 379/114.2 |
| 2002/0097853 A1* | 7/2002 | Ouijdani et al. | 379/114.02 |
| 2003/0012203 A1* | 1/2003 | Deshpande et al. | 370/401 |
| 2003/0076816 A1* | 4/2003 | Naranjo et al. | 370/352 |
| 2004/0028057 A1* | 2/2004 | Benjamin et al. | 370/395.52 |
| 2007/0168517 A1* | 7/2007 | Weller et al. | 709/226 |
| 2007/0291921 A1* | 12/2007 | Fleischer et al. | 379/229 |
| 2008/0222291 A1* | 9/2008 | Weller et al. | 709/226 |

* cited by examiner

*Primary Examiner*—Binh K Tieu

(57) ABSTRACT

A method and apparatus for utilizing a tiered flat rate pricing structure for at least one call in a packet network is described. In one embodiment, at least one call is serviced by a call control element. The at least one call is then accounted for by associating the call(s) to a billing structure that includes at least three categories, wherein a first category comprises an on-net call-type category, a second category comprises an off-net domestic call-type category, and a third category comprises an off-net international call-type category.

11 Claims, 4 Drawing Sheets

METHOD AND APPARATUS FOR UTILIZING A TIERED FLAT RATE PRICING STRUCTURE IN A PACKET NETWORK

BACKGROUND OF THE INVENTION

1. Field of the Invention

Embodiments of the present invention generally relate to telecommunications systems and, more particularly, to a method and apparatus for utilizing a tiered flat rate pricing structure in a packet network.

2. Description of the Related Art

In a packet network, e.g., a Voice over Internet Protocol (VoIP) network, telephone numbers of subscribers are not geographically specific. Notably, endpoints with the same area code may be physically located thousands of miles from each other. As VoIP services become more available, the concept of location specific pricing and call rating becomes obsolete and irrelevant. However, many VoIP carriers continue to maintain complex pricing structures especially for international calls. Pricing structures are so complex they usually span a full web page or, alternatively, necessitate a stand-alone insert in a fulfillment package. This complexity creates customer dissatisfaction and drives up care costs in response to customers' complaints about their bills.

Thus, there is a need in the art for a method and apparatus for utilizing a tiered flat rate pricing structure in a packet network.

SUMMARY OF THE INVENTION

In one embodiment, a method and apparatus for utilizing a tiered flat rate pricing structure for at least one call in a packet network is described. More specifically, at least one call is serviced by a call control element. The at least one call is then billed by associating the call(s) to a billing structure that includes at least three categories, wherein a first category comprises an on-net call-type category, a second category comprises an off-net domestic call-type category, and a third category comprises an off-net international call-type category.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
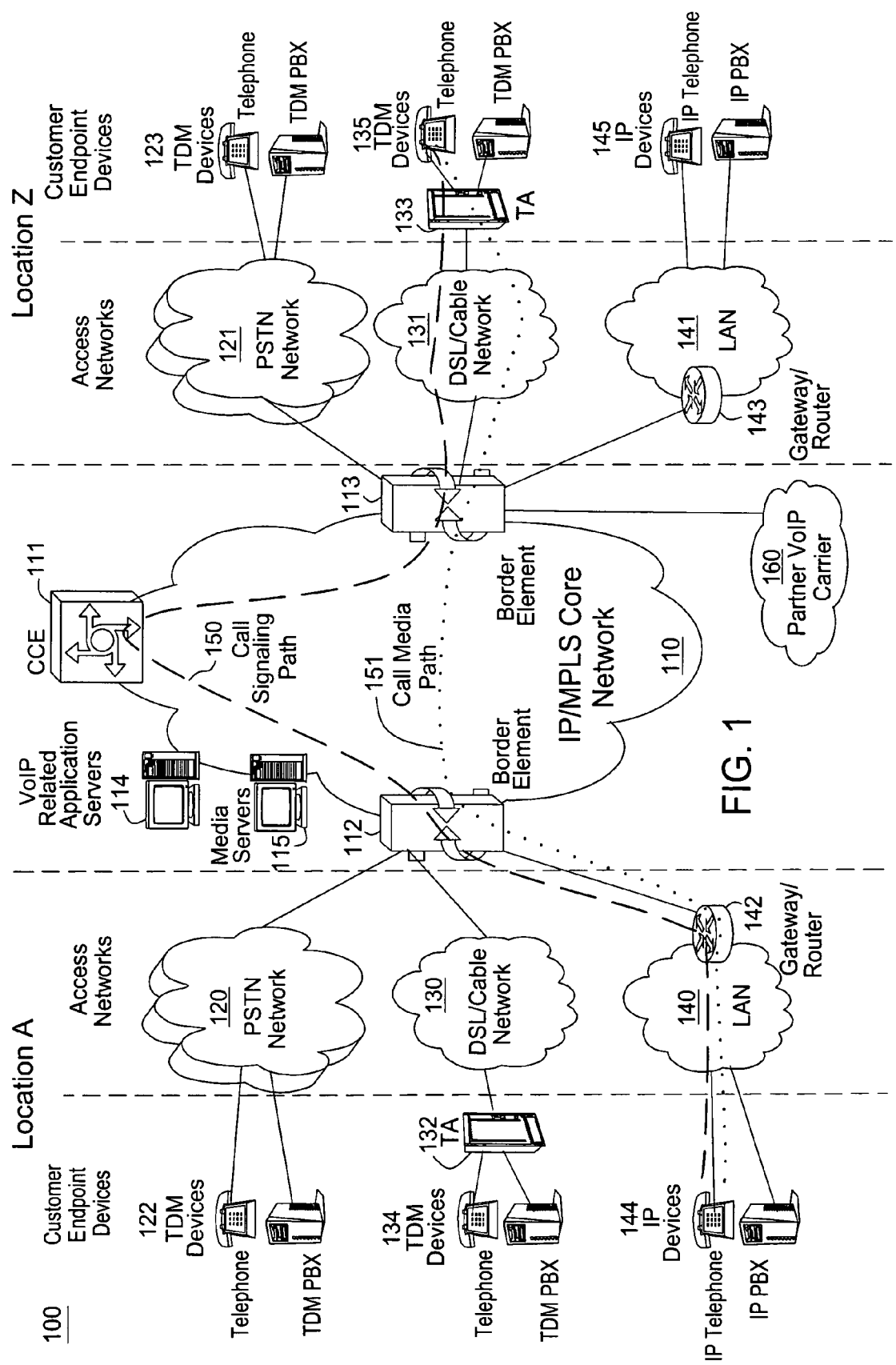
FIG. 1 is a block diagram depicting an exemplary embodiment of a communication system in accordance with the invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
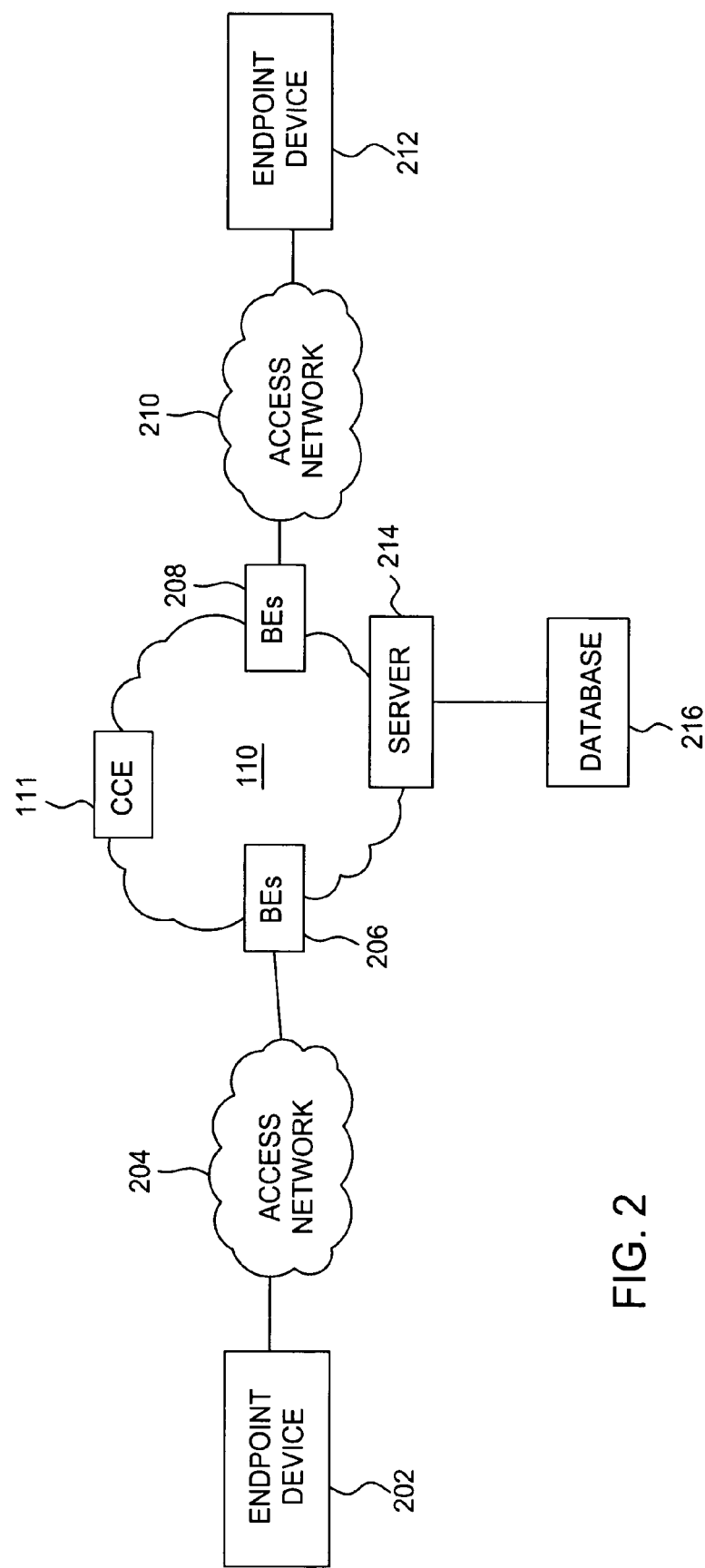
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc).

The core network 110 also includes a server 214 in communication with a database 216. In one embodiment of the present invention, the server 214 comprises a dedicated application server that is configured to determine the call-type categories (e.g., on-net, domestic off-net, international off-net, etc.) and the durations of various calls made by network subscribers. The server 214 is also responsible for recording and maintaining customer records within the database 216. The database 216 may be any type of electronic collection of data that is well known in the art. In one embodiment, the database 216 stores data associated with a plurality of customers such as an identifier (e.g., identification number or name), registered services, current billing rates, the types of calls made, the number of minutes used in each call-type category (i.e., a cumulative duration record), and predefined pricing structure tiers for the call-type categories.

In one embodiment of the present invention, an endpoint user (e.g., a subscriber or customer) utilizes an endpoint device 202 to contact a second endpoint device 212. The first endpoint device 202 is typically connected to a VoIP (or SoIP) network 110. The second endpoint device 212 may be coupled to various types of networks, such as a VoIP network, a local PSTN network, an international network, and the like. The call connection that exists between the two endpoint devices may be classified into several different categories depending on the location of the second endpoint device 212. If both endpoint devices are located on a VoIP network, the call may be classified as an "on-net" call. Similarly, if the call originates in the customer's VoIP network and terminates on a domestic (PSTN), the call may be classified as a domestic "off-net" call (e.g., the access network 210 is a PSTN network). Lastly, a call that originates on the VoIP network and terminates at an international PSTN (e.g., the access network 210 comprises an international PSTN), the call may be categorized as an "off-net" international call.

Figure 3:
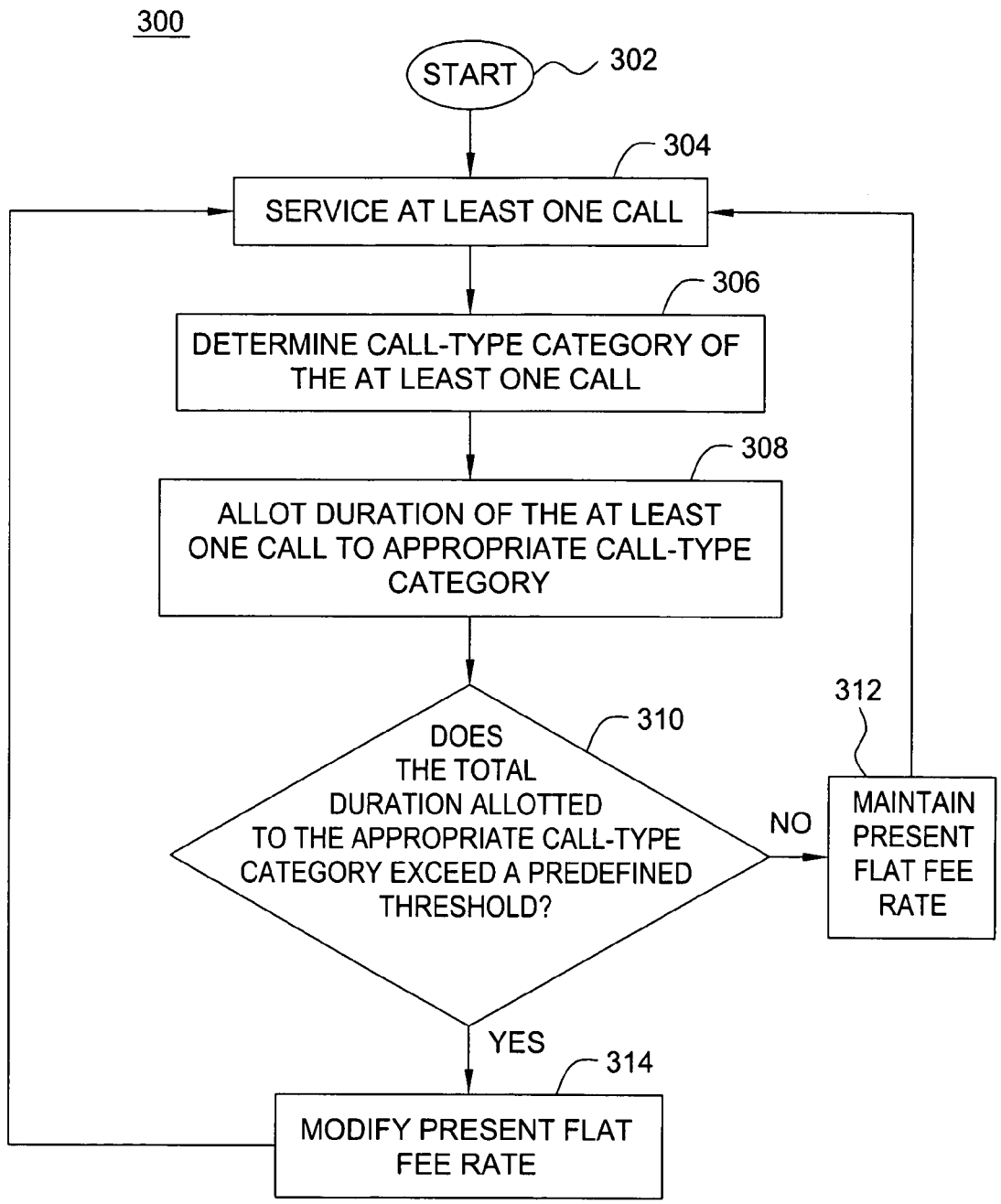
FIG. 3 is a flow diagram depicting an exemplary embodiment of a method for utilizing a tiered flat rate pricing structure in a packet network in accordance with one or more aspects of the invention.

FIG. 3 is a flow diagram depicting an exemplary embodiment of a method 300 for utilizing a tiered flat rate pricing structure for at least one call in a packet network as related to one or more aspects of the invention. The method 300 begins at step 302 and proceeds to step 304 where at least one call is serviced. In one embodiment, a CCE 111 receives a request from a first endpoint device 202 to establish communication with a second endpoint device 212. In response, the CCE 111 processes the call and establishes the necessary communication services between the two endpoint devices.

At step 306, the call-type of the previously established call is determined. Depending on the embodiment, this step may be executed before or after step 304. In one embodiment, the server 214 may utilize some network means (e.g., call detail records (CDRs)) to ascertain the location of both the first and second endpoint devices. For example, the server 214 may be configured to process a CDR to determine the respective networks to which the endpoint devices are connected. Once this information is determined, the call-type may be categorized accordingly. For example, if the endpoint device 202 in the service provider's VoIP network contacts endpoint device 212 via an international PSTN access network (e.g., access network 210), the server 214 would determine the origin of the endpoint device 212 using CDRs and thus, classify the call as an international "off-net" call.

At step 308, the duration of the call is recorded and allotted (i.e., "accounted") to an appropriate call-type category. In one embodiment, the server 214 utilizes call detail records of a network element that serviced the call to determine the total call duration. The server 214 then allots the number of minutes of the call to an "account" (e.g., a cumulative duration record) associated to the appropriate call-type category. Notably, each call-type category (e.g., on-net calls, off-net domestic calls, off-net international calls, etc.) has a predefined number of minutes for a given billing tier. For instance, a service agreement between a customer and the service provider may detail a billing structure comprising three tiers for international off-net calls (as well as on-net calls, off-net domestic calls, and the like), each tier having a specific predefined flat billing rate. For example, the service agreement may specify that all international "off-net" calls may be rated and billed in accordance to $30.00 for 100 minutes per month (i.e., tier 1). Likewise, a "second tier" with a flat rate of $40 for 101-400 minutes per month and a "third tier" with a flat rate of $50 for 401-950 minutes per month may be predefined in the service agreement. Therefore, a 15 minute off-net international call would account for 15 of the 100 minutes permitted for "tier 1" pricing and would be recorded in database 216 by the server 214. Consequently, the customer would then only have 85 minutes remaining for international off-net calls to qualify for the tier 1 flat rate price.

At step 310, an inquiry as to whether the total duration allotted to the appropriate call-type category (i.e., the cumulative duration record) exceeds a predefined threshold. In one embodiment, the predefined threshold is the predetermined amount of minutes in a given tier as specified in the service contract. If the threshold is exceeded, then the method 300 proceeds to step 314 where the present flat fee rate is modified. More specifically, in the event the time usage threshold (e.g., allowed "minutes") of a particular call-type is exceeded, then a change to the next tier is registered. Thus, the customer can expect to be billed at the flat fee that is associated to the next predefined tier. For example, if the customer utilizes more than 100 international off-net minutes per month, the flat rate increases to the next tier, e.g., $40.00 for 101-400 minutes per month as agreed to in the customer's service contract. In the event the threshold is not exceeded, then the method 300 continues to step 312 where the present flat fee rate is maintained.

After the method 300 determines whether to maintain or modify the present flat fee rate, the method 300 continues to step 304 where subsequent calls may be serviced.

Figure 4:
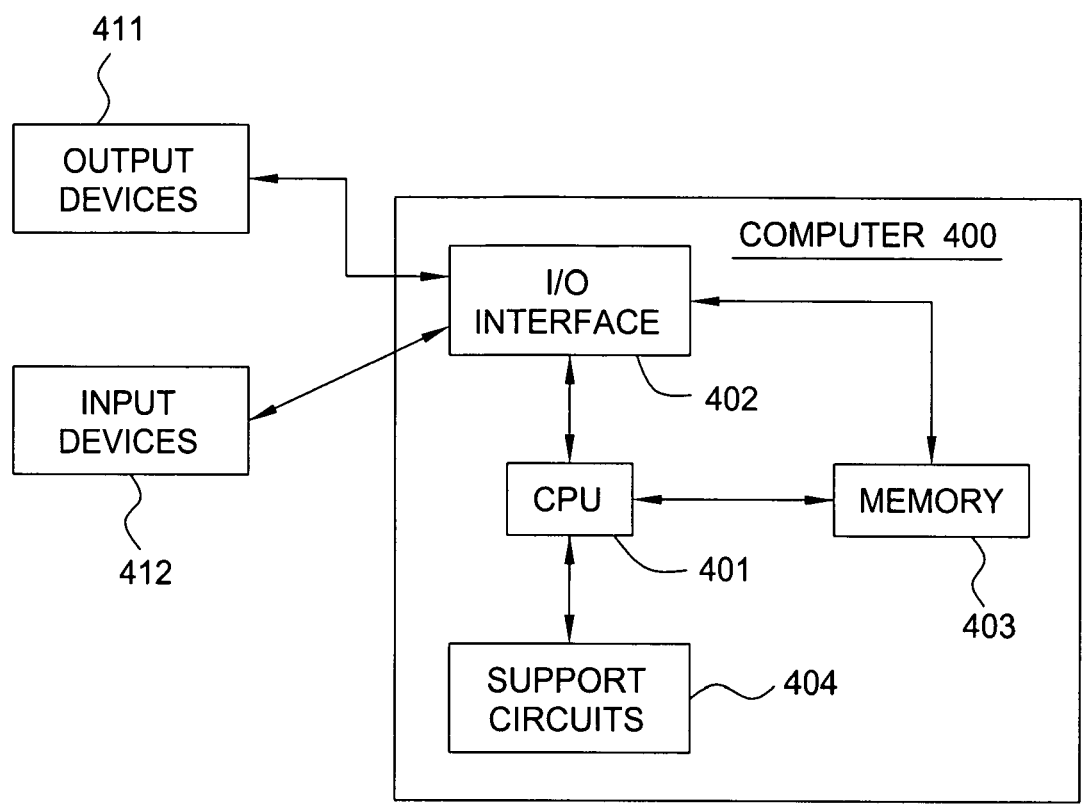
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. The computer 400 may be used to implement the server 214 of FIG. 2. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, display, and the like.

The memory 403 may store all or portions of one or more programs and/or data to implement the processes and methods described herein. Notably, the memory 403 may store billing software capable of implementing the tier structure described above. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

What is claimed is:

1. A method for utilizing a tiered flat rate pricing structure for at least one call in a packet network, comprising:
   servicing at least one call; and
   accounting said at least one call by associating said at least one call to a billing structure having at least three call-type categories, wherein a first call-type category comprises an on-net category, a second call-type category comprises an off-net domestic category, and a third call-type category comprises an off-net international category, wherein a call associated with said on-net category originates and terminates on said packet network, wherein a call associated with said off-net domestic category originates on said packet network and terminates on a domestic public switched telephone network (PSTN) network, and wherein a call associated with said off-net international category originates on said packet network and terminates on an international public switched telephone network (PSTN).

2. The method of claim 1, wherein said accounting step comprises:
   identifying a call-type category associated to said at least one call;

adding a duration of said at least one call to a cumulative duration record associated to said call-type category; and modifying a present flat fee rate in the event said cumulative duration record exceeds a predefined threshold.

3. The method of claim 1, wherein said packet network comprises an Internet Protocol (IP) network.

4. The method of claim 2, wherein the IP network comprises at least one of: a voice over Internet protocol (VoIP) network or a service over Internet protocol (SoIP) network.

5. An apparatus for utilizing a tiered flat rate pricing structure for at least one call in a packet network, comprising:

means for servicing at least one call; and means for accounting said at least one call by associating said at least one call to a billing structure having at least three call-type categories, wherein a first call-type category comprises an on-net category, a second call-type category comprises an off-net domestic category, and a third call-type category comprises an off-net international category, wherein a call associated with said on-net category originates and terminates on said packet network, wherein a call associated with said off-net domestic category originates on said packet network and terminates on a domestic public switched telephone network (PSTN) network, and wherein a call associated with said off-net international category originates on said packet network and terminates on an international public switched telephone network (PSTN).

6. The apparatus of claim 5, wherein said means for accounting comprises:

means for identifying a call-type category associated to said at least one call;

means for adding a duration of said at least one call to a cumulative duration record associated to said call-type category; and means for modifying a present flat fee rate in the event said cumulative duration record exceeds a predefined threshold.

7. The apparatus of claim 5, wherein said packet network comprises an Internet Protocol (IP) network.

8. A computer readable medium having stored thereon instructions that, when executed by a processor, causes the processor to perform a method for utilizing a tiered flat rate pricing structure for at least one call in a packet network, comprising:

servicing at least one call; and accounting said at least one call by associating said at least one call to a billing structure having at least three call-type categories, wherein a first call-type category comprises an on-net category, a second call-type category comprises an off-net domestic category, and a third call-type category comprises an off-net international category, wherein a call associated with said on-net category originates and terminates on said packet network, wherein a call associated with said off-net domestic category originates on said packet network and terminates on a domestic public switched telephone network (PSTN) network, and wherein a call associated with said off-net international category originates on said packet network and terminates on an international public switched telephone network (PSTN).

9. The computer readable medium of claim 8, wherein said accounting step comprises:

identifying a call-type category associated to said at least one call;

adding a duration of said at least one call to a cumulative duration record associated to said call-type category; and modifying a present flat fee rate in the event said cumulative duration record exceeds a predefined threshold.

10. The computer readable medium of claim 8, wherein said packet network comprises an Internet Protocol (IP) network.

11. The computer readable medium of claim 9, wherein the IP network comprises at least one of: a voice over Internet protocol (VoIP) network or a service over Internet protocol (SoIP) network.

* * * * *